United States Patent

Harada

[11] Patent Number: 5,963,558
[45] Date of Patent: Oct. 5, 1999

[54] DATA TRANSMISSION SYSTEM AND A TERMINAL MANAGEMENT METHOD OF THE SAME

[75] Inventor: Shigekazu Harada, Tokyo, Japan

[73] Assignee: NEC Corporation, Tokyo, Japan

[21] Appl. No.: 09/187,741

[22] Filed: Nov. 9, 1998

[30] Foreign Application Priority Data

Nov. 12, 1997 [JP] Japan .................................. 9-325147

[51] Int. Cl.⁶ .................................................. H04B 7/212
[52] U.S. Cl. ......................... 370/442; 370/395; 370/348
[58] Field of Search .................................. 370/395, 347, 370/348, 407, 408, 410, 442, 443, 437, 458, 451, 522

[56] References Cited

U.S. PATENT DOCUMENTS 5,761,197  6/1998  Takefman ................................ 370/337
5,878,042  3/1999  Fraas et al. ............................. 370/395

FOREIGN PATENT DOCUMENTS 64-36130   2/1989  Japan .
6-303174  10/1994  Japan .

*Primary Examiner*—Michael Horabik
*Assistant Examiner*—Binyam Tadesse
*Attorney, Agent, or Firm*—McGinn & Gibb, P.C.

[57] ABSTRACT

For enabling to obtain automatically a proper identifier of a remote terminal and to assign an identification number to the remote terminal in order to performing supple communication control of a data transmission system wherein upward communication is performed according to a TDMA system and downward communication is performed according to a TDM system making use of cells having fixed length; a local station of the system comprises: a command-cell generation timer (112) for generating a command-cell generation trigger periodically, a command-cell generating unit (113) for generating a command cell to be downward transmitted every time the command-cell generation trigger is supplied by writing an available identification number therein, a window generation timer (111) for enabling a window signal every time the command-cell generation trigger is supplied for inhibiting transmission of upward cells from the remote terminals whereto identification numbers are assigned, a control-data-cell generating/terminating unit (107) for detecting a newly installed remote terminal by receiving a control data cell during the window signal is enabled, wherein a proper identifier of the newly installed remote terminal is written, and a terminal management unit (109) for assigning the available identification number to the newly installed remote terminal.

10 Claims, 3 Drawing Sheets

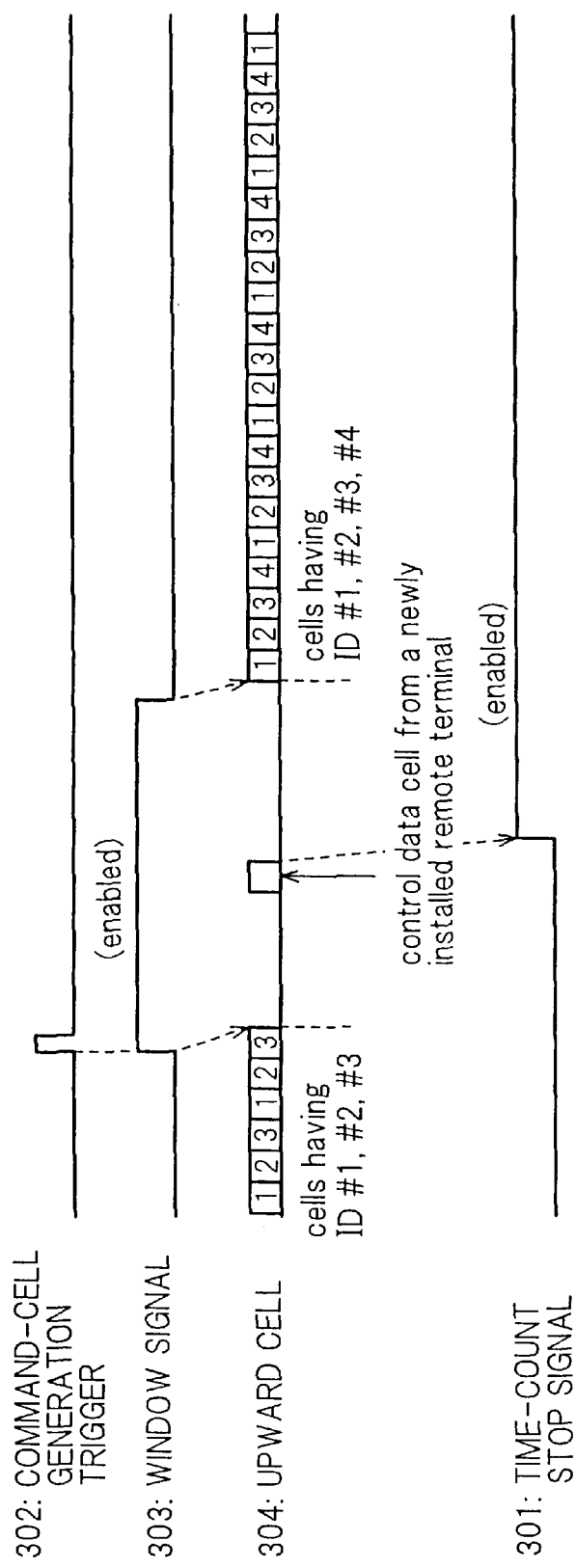

DATA TRANSMISSION SYSTEM AND A TERMINAL MANAGEMENT METHOD OF THE SAME

BACKGROUND OF THE INVENTION

The present invention relates to a data transmission system for performing data exchange between a local station and remote terminals, such as DSUs (Data Service Units), which are star-connected to the local station, and particularly to a terminal management method of the data transmission system wherein data transmission from a remote terminal to the local station (hereinafter called upward communication) is performed according to a TDMA (Time Division Multiple Access) system and data transmission from the local station to the remote terminals (hereinafter called downward communication) is performed according to a TDM (Time Division Multiplex) system, making use of cells having fixed length.

In data transmission systems having a star connection, such as used in a POS (Point Of Sales) system, there are systems wherein data exchange is performed making use of fixed-length packets called cells, including main data cells for transmitting data to be communicated and control data cells used for controlling or status-monitoring of the data transmission system. These cells have header information fields for loading control information such as destination of the cells, kinds of the cells or transmission permission to remote terminals.

To avoid collisions among cells transmitted upward from remote terminals which are star-connected, cell transmission control of the remote terminals, such as transmission permission control, band-width control or cell-phase control, is performed in the local station, and the remote terminals transmit upward cells under control of the local station.

For efficiently performing the cell transmission control of each individual remote terminal, usually an identification number, which is unique in a closed area consisting of a local station and remote terminals connected thereto, is assigned to each of the remote terminals, besides their own identifiers, such as product numbers. The identification numbers assigned to the remote terminals are registered in the local station in connection with the product numbers, for example, obtained from the remote terminals, and the assigned identification numbers are memorized by the remote terminals to be referred to afterwards for discriminating the same.

As to acquisition of the proper identifier such as the product number of the remote terminal and assignment of the local identification number, there have been proposed some methods.

In a Japanese patent application laid open as a Provisional Publication No. 036130/'89, there is disclosed a prior art to assigning an identification number to a radio-telephone terminal from a relay-station, in order to avoid costs of setting the identification number to the relay-station equipment and the radio-telephone terminals in their production factory at the shipping, and in a Japanese patent application laid open as a Provisional Publication No. 303174/'94, a wireless data communication system is disclosed, wherein polling to a wireless terminal is automatically suspended when the wireless terminal leaves the system and it is started again automatically when the wireless terminal returns to the system.

However, according to the former prior art, the proper identifier such as the product number of the remote terminal should be beforehand registered manually in the relay-station for assigning the local identification number automatically in connection with the proper identifier.

In the latter prior art, polling controlled can be performed automatically for improving band-width efficiency according to numbers of active wireless terminals. However, the proper identifiers of the wireless terminals are not managed, and therefore, the system could not recognize automatically a wireless terminal newly installed in the system.

Further, the data transmission system as above mentioned, wherein the upward communication is performed according to the TDMA system and the downward communication is performed according to the TDM system, needs specific communication control, and so, prior arts as above described cannot be applied as they are.

SUMMARY OF THE INVENTION

Therefore, a primary object of the present invention is to provide a method of and apparatus for terminal management, which enables to obtain a proper identifier, such as the product number, of a newly installed remote terminal and to assign a local identification number to the remote terminal in connection with the proper identifier, for performing supple communication control, including band-width and cell-phase control of each individual remote terminal, of a data transmission system wherein the upward communication is performed according to the TDMA system and the downward communication is performed according to the TDM system, making use of fixed-length cells.

In order to achieve the object, a terminal management method of a data transmission system having a local station and remote terminals star-connected to the local station, wherein upward communication from the remote terminals to the local station is performed according to a TDMA system and downward communication from the local station to the remote terminals is performed according to a TDM system making use of cells having fixed length, comprises:

a step of downward transmitting a command cell periodically from the local station when there is an available identification number which is not assigned to any of the remote terminals star-connected to the local station, the available identification number being written in the command cell;

a step of generating a window period after downward transmitting the command cell, transmission of upward cells from the remote terminals, whereto identification numbers are assigned, being inhibited in the window period;

a step of receiving the command cell performed by a newly installed remote terminal which is not assigned with any identification number, for obtaining the available identification number written in the command cell;

a step of upward transmitting a control data cell from the newly installed remote terminal in the window period, a proper identifier of the newly installed remote terminal being written in the control data cell together with the available identification number;

a step of receiving the control data cell performed by the local station and obtaining the proper identifier of the newly installed remote terminal together with the available identification number; and a step of assigning the available identification number to the newly installed remote terminal and registering the proper identifier of the newly installed remote terminal in connection with the available identification number.

Therefore, acquisition of the proper identifier of the newly installed remote terminal and assignment of a local identification number to the newly installed remote terminal can be performed automatically according to the invention, and appropriate cell transmission control of the remote terminals, such as transmission permission control, bandwidth control or cell-phase control, can be performed in the local station, making use of the local identification numbers assigned in connection with the proper identifiers of the remote terminals, enabling to improve transmission efficiency of the data transmission system.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings:

FIG. 3 is a time chart illustrating operation of the data transmission system.

DETAILED DESCRIPTION OF THE PREFERRED EMBODIMENTS

Now, embodiments of the present invention will be described in connection with the drawings.

Figure 1:
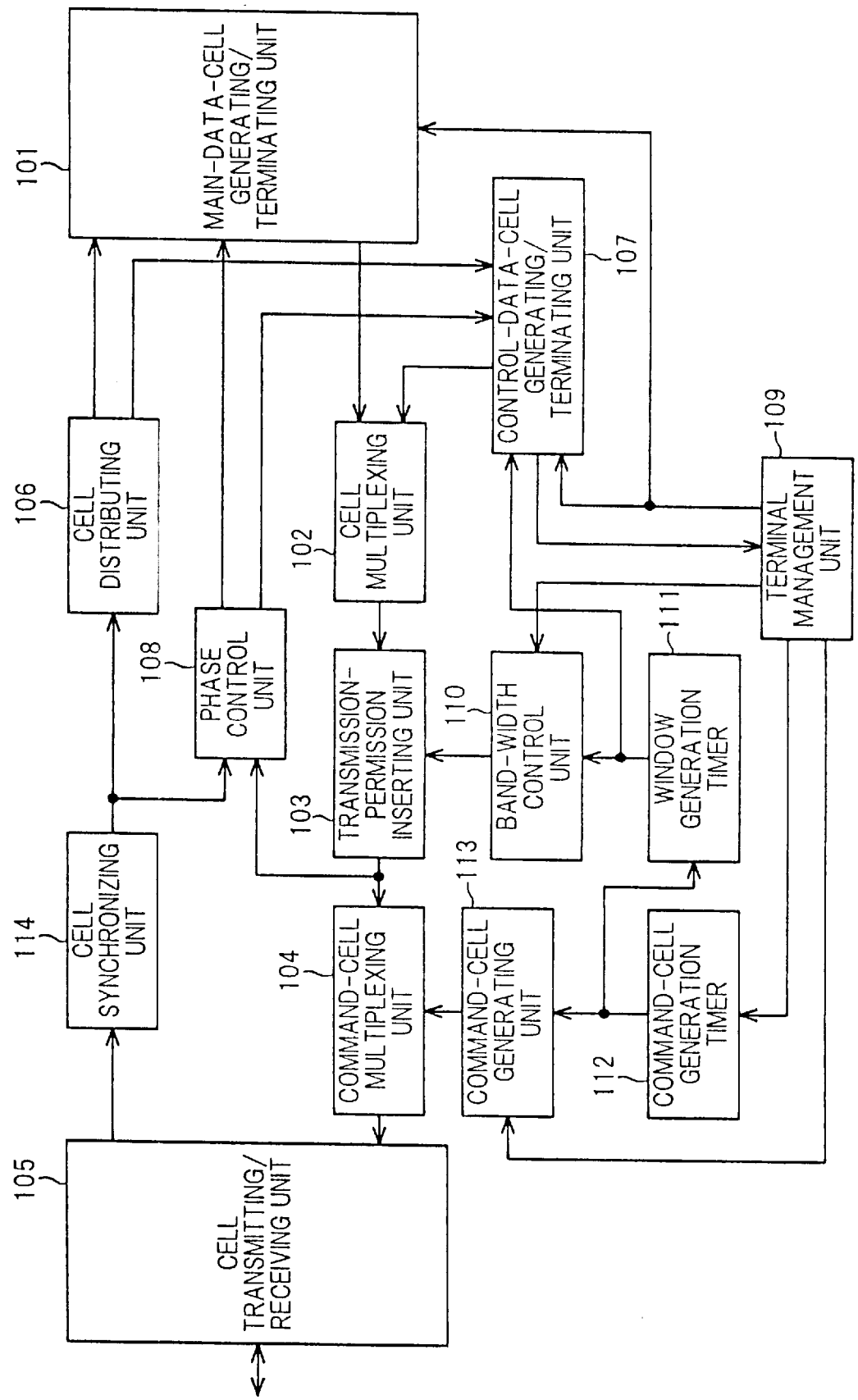
FIG. 1 is a functional block diagram illustrating configuration examples of a local station of a data transmission system according to an embodiment of the invention.
Figure 2:
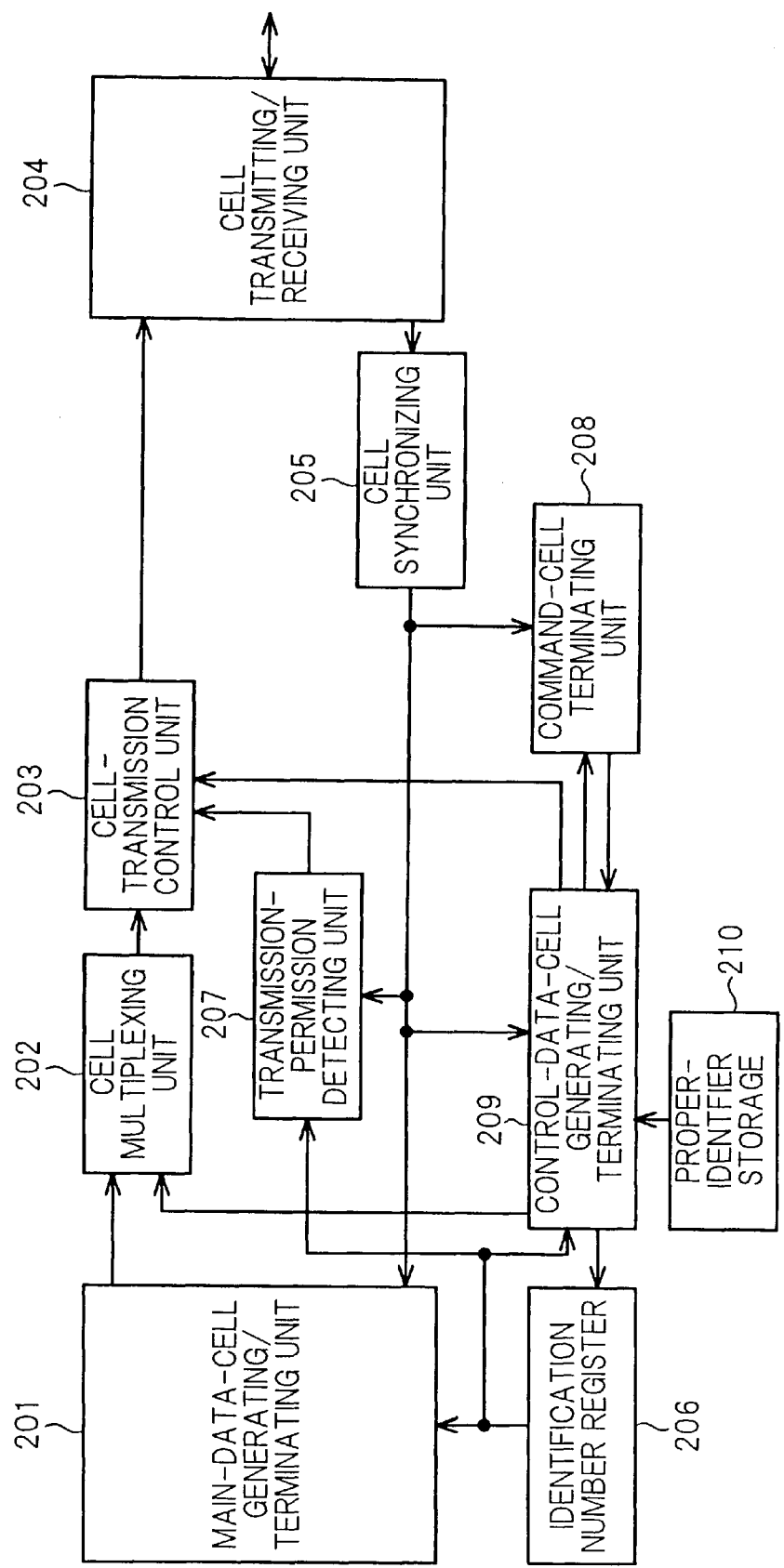
FIG. 2 is a functional block diagram illustrating configuration examples of a remote terminal of the data transmission system.

FIGS. 1 and 2 are functional block diagrams illustrating configuration examples of a local station and a remote terminal, respectively, of a data transmission system according to an embodiment of the invention.

In the data transmission system, a plurality of remote terminals having a configuration of FIG. 2 are star-connected to a local station of FIG. 1. Upward communication from the remote terminals to the local station is performed according to the TDMA system, while downward communication from the local station to the remote terminals is performed according to the TDM system.

Referring to FIG. 1, the local station of the embodiment comprises a main-data-cell generating/terminating unit 101, a cell multiplexing unit 102, a transmission-permission inserting unit 103, a command-cell multiplexing unit 104, a cell transmitting/receiving unit 105, a cell distributing unit 106, a control-data-cell generating/terminating unit 107, a phase control unit 108, a terminal managing unit 109, a band-width control unit 110, a window generation timer 111, a command-cell generation timer 112, a command-cell generating unit 113, and a cell synchronizing unit 114.

Main data cells generated by the main-data-cell generating/terminating unit 101 and control data cells generated by the control-data-cell generating/terminating unit 107 are multiplexed by the cell multiplexing unit 102. The transmission-permission inserting unit 103 inserts transmission permitting information into headers of cells outputted from the cell multiplexing unit 102, according to band-width assignment information supplied from the band-width control unit 110.

When a command cell is generated by the command-cell generating unit 113, it is multiplexed with priority by the command-cell multiplexing unit 104 to the cells outputted from the transmission-permission inserting unit 103.

The cell transmitting/receiving unit 105, which is connected with a plurality of remote terminals by way of a coupler (not depicted in the drawings) configuring a star connection, transmits the cells inputted from the command-cell multiplexing unit 104 towards the remote terminals, and transfers cells received through the coupler from the remote terminals to the cell synchronizing unit 114, which performs cell synchronization of the cells transferred from the cell transmitting/receiving unit 105.

The cell distributing unit 106 classifies the cells outputted from the cell synchronizing unit 114 into main data cells to be distributed to the main-data-cell generating/terminating unit 101 and control data cells to be distributed to the control-data-cell generating/terminating unit 107.

The main-data-cell generating/terminating unit 101 takes charge of generating main data cells by adding identification numbers of the remote terminals supplied from the terminal management unit 109 onto cells of data to be transmitted to the remote terminals, and reproducing data transmitted from the remote terminals by de-celling the main data cells distributed from the cell distributing unit 106. The main-data-cell generating/transmitting unit 101 discriminates sender of each main data cell making use of sender identification number supplied from the phase control unit 108.

The phase control unit 108 monitors each of the cells outputted from the cell synchronizing unit, specifies the sender identification number of each cell, and generates phase-correction information when a phase gap is detected by referring to the transmission permitting information which is inserted to downward cells by the transmission-permission inserting unit 103. The phase-correction information is supplied associated with the sender identification number to the control-data-cell generating/terminating unit 107, and the sender identification number is supplied to the main-data-cell generating/terminating unit 101.

The control data cells distributed from the cell distributing unit 106 are received by the control-data-cell generating/terminating unit 107. When a control data cell is received during a window signal supplied from the window generation timer 111 is enabled, the control-data-cell generating/terminating unit 107 checks whether a new remote terminal is installed or not, by extracting the identification number and the proper identifier of the remote terminal from certain fields of the received control data cell. In case installation of a new remote-terminal is detected, the proper identifier and the identification number are reported to the terminal management unit 109.

The control-data-cell generating/terminating unit 107 also takes charge of generating control data cells to be multiplexed by the cell multiplexing unit 102 by adding identification numbers of the remote terminals supplied from the terminal management unit 109 onto cells of control data to be transmitted to the remote terminals.

The band-width control unit 110 generates the band-width assignment information to be referred to by the transmission-permission inserting unit 103 for each remote terminal, according to identification numbers of the remote terminals and band-widths assigned to them which are supplied from the terminal management unit 109.

When the window signal supplied from the window generation timer 111 is enabled, the band-width control unit 110 controls the transmission-permission inserting unit 103 to insert transmission inhibiting information to every cell header.

The terminal management unit 109 has functions to notify an identification number which is not assigned to any remote terminal, when there is left any, to the command-cell generating unit 113, to register the proper identifier of the newly installed remote terminal, which is reported from the control-data-cell generating/terminating unit 107, in connection with the identification number assigned thereto, to determine band-widths of the remote terminals to be notified to the band-width control unit 110 in connection with their identification numbers, to control the command-cell generation timer 112 to stop time count when there is left no unused identification number, and to control the command-cell generation timer 112 to re-start the time count when a connection with a remote terminal is cut and the identification number assigned to the remote terminal becomes unused.

The command-cell generation timer 112 generates a command-cell generation trigger periodically when it is not controlled to stop the time count by the terminal management unit 109.

The command-cell generating unit 113 generates a command cell every time the command-cell generation trigger is supplied from the command-cell generation timer 112. The command cell, wherein the unused identification number notified from the terminal management unit 109 is written, is transferred to the command-cell multiplexing unit 104 to be multiplexed.

The window generation timer 111 enables the window signal to be supplied to the band-width control unit 110 and the control-data-cell generating/terminating unit 107 for a certain period, every time when the command-cell generation trigger is generated by the command-cell generation timer 112. The period where the window signal is enabled is so determined as to be sufficiently shorter than a generation cycle of the command-cell generation trigger and longer than a time needed from transmitting a command cell until receiving a control-data-cell responding to the command cell from a farthest remote terminal in the service area of the local station.

Now, the configuration example of FIG. 2 of the remote terminal according to the embodiment is described.

The remote terminal of FIG. 2 comprises a main-data-cell generating/terminating unit 201, a cell multiplexing unit 202, a cell-transmission control unit 203, a cell transmitting/receiving unit 204, a cell synchronizing unit 205, an identification number register 206, a transmission-permission detecting unit 207, a command-cell terminating unit 208, a control-data-cell generating/terminating unit 209, and a proper-identifier storage 210.

Main data cells generated by the main-data-cell generating/terminating unit 201 and control data cells generated by the control-data-cell generating/terminating unit 209 are multiplexed by cell multiplexing unit 202, priority being given to the control data cells.

The cell-transmission control unit 203 takes charge of controlling transmission timings of cells. multiplexed by the cell multiplexing unit 202 according to transmission permitting information detected by the transmission-permission detecting unit 207 and phase-correction information supplied from the control-data-cell generating/terminating unit 209.

The cell transmitting/receiving unit 204 transmits the cells outputted from the cell-transmission control unit to the local station through the coupler, and receives cells transmitted from the local station.

The cell synchronizing unit 205 performs cell synchronization of the cells received by the cell transmitting/receiving unit 204 and distributes command cells thereof to the command-cell terminating unit 208, control data cells thereof to the control-data-cell generating/terminating unit 209, and main data cells thereof to the main-data-cell generating/terminating unit 201.

The main-data-cell generating/terminating unit 201 performs de-celling of the main data cells addressed to the remote terminal referring to the assigned identification number registered in the identification number register 206, and generates main data cells to be transmitted to the local station.

When a command cell is distributed from the cell synchronizing unit 205 during a command-cell detecting signal is enabled, the command-cell terminating unit 208 extracts the identification number written in the command cell and notifies the identification number to the control-data-cell generating/terminating unit 209. When the command-cell detecting signal is disabled, distributed command cells are ignored.

Notified of the identification number from the command-cell terminating unit 208, the control-data-cell generating/terminating unit 209 registers the identification number in the identification number register 206 and generates a control data cell to be outputted to the cell multiplexing unit 202, writing therein the identification number and the proper identifier of the remote terminal stored in the proper-identifier storage 210. At the same time, the control-data-cell generating/terminating unit 209 disables the command-cell detecting signal to be supplied to the command-cell terminating unit 208, and begins to catch control data cells addressed to the remote terminal referring to the identification number stored in the identification number register 206, for extracting therefrom the phase-correction information to be supplied to the cell-transmission control unit 203.

The identification number stored in the identification number register 206 is referred to by the main-data-cell generating/terminating unit 201, the control-data-cell generating/terminating unit 209 and the transmission-permission detecting unit 207.

In the proper-identifier storage 210, which is made of a non-volatile memory, the proper identifier of the remote terminal itself such as the product number is stored and referred to by the control-data-cell generating/terminating unit 209.

The transmission-permission detecting unit 207 detects transmission permitting information of the remote terminal inserted in the headers of the cells outputted from the cell synchronizing unit 205, referring to the identification number stored in the identification number register 206. The transmission permitting information detected by the transmission-permission detecting unit 207 is supplied to the cell-transmission control unit 203.

Now, operation of the embodiment is described.

In the following paragraphs, operation of the local station is described first.

When there is left no available identification number, the terminal management unit 109 controls the command-cell generation timer 112 to stop time count, and hence, no command cell is generated and no window period (wherein no transmission permitting information is inserted in the downward cells) is inserted by the window generation timer 111.

The band-width control unit 110 inhibits insertion of the transmission permitting information into the downward cells during the window signal is enabled, and therefore, no cell is transmitted from the remote terminals already connected to the local station, in the window period.

When there is a remote terminal newly installed, the control-data-cell generating/terminating unit 107 receives a control data cell from the remote terminal in the window period. The control-data-cell generating/terminating unit 107 extracts therefrom a proper identifier of the newly installed remote terminal together with the unused identification number, which are notified to the terminal management unit 109.

The phase control unit 108, which is monitoring cell phase of the upward cell, outputs phase-correction information to the control-cell-generating/terminating unit 107 together with the identification number of the upward cell, so that the phase-correction information is written in the control data cell to be transmitted to a remote terminal of the identification number.

Meanwhile, upward band-widths are re-assigned to the remote terminals including the newly installed remote terminal by the terminal management unit 109 and reported to the band-width control unit 110. The band-width control unit 110 begins to output the band-width assignment information to the transmission-permission inserting unit 103 according to the newly assigned band-widths, after the window signal is disabled.

In the following paragraphs, operation of the remote terminal of FIG. 2 is described.

Just after a remote terminal is switched on and connected to the coupler, the remote terminal waits for a command cell. Receiving a command cell, the command-cell terminating unit 208 extracts the identification number written therein, and notifies it to the control-data-cell generating/terminating unit 209.

The control-data-cell generating/terminating unit 209 registers the extracted identification number in the identification number register 206 as its own identification number, generates a control data cell, wherein the identification number and the proper identifier of the remote terminal stored in the proper-identifier storage 210 are written, to be outputted to the cell multiplexing unit 202, and disables the command-cell detecting signal.

The control data cell is multiplexed by the cell multiplexing unit 202 and transmitted to the local station. Here, the cell-transmission control is not performed.

Then, the identification number stored in the identification number register 206 is delivered to the main-data-cell generating/terminating unit 201, the control-data-cell generating/terminating unit 209 and the transmission-permission detecting unit 207 so that they can discriminate the downward cells addressed to the remote terminal.

According to phase-correction information written in the control data cells to be received afterwards, the cell-transmission control unit 207 is to perform the cell-transmission control.

In the following paragraphs, a more concrete operation example of the embodiment is described.

Suppose, by way of example, that three remote terminals have been connected to a local station of FIG. 1 having ability to communicate with at most four remote terminals, and a fourth remote terminal of FIG. 2 is installed now.

When the local station is communicating with only three remote terminals making use of three identification numbers #1, #2 and #3, a fourth identification number #4 is left unused.

Therefore, the command-cell generation timer 112 is controlled to perform the time count for generating the command-cell generation trigger periodically. According to the command-cell generation trigger, the command-cell generation unit 113 generates a command cell to be downward transmitted through the coupler, writing therein the unused identification number #4 which is supplied from the terminal management unit 109, and the window generation timer 111 enables the window signal periodically in synchronization with the command-cell generation trigger.

When the fourth remote terminal is switched on, the command cell is received by the cell transmitting/receiving unit 204 of the fourth remote terminal and distributed to the command-cell terminating unit 208, whereby the identification number #4 is extracted therefrom and notified to the control-data-cell generating/terminating unit 209.

The control-data-cell generating/terminating unit 209 registers the identification number #4 in the identification number register 206, and generates a control data cell, writing therein the identification number #4 and the proper identifier of the remote terminal stored in the proper-identifier storage 210, the product number of the remote terminal, for example, which is multiplexed by the cell multiplexing unit 202 to be transmitted toward the local station.

In the local station, the control-data-cell transmitted from the fourth remote terminal in the window period (time period when the window signal is enabled and no transmission permitting information is inserted in the downward cells) is distributed to the control-data-cell generating/terminating unit 107 and the product number of the fourth remote terminal is extracted therefrom together with the identification number #4. Thus, the installation of the fourth remote terminal is discriminated and reported to the terminal management unit 109.

Here, the control data cell responding to the command cell is transmitted without transmission permitting information. Therefore, the phase control unit 108 outputs only the phase-correction information to the control-data-cell generating/terminating unit 107.

The terminal management unit 109 registers the product number of the fourth remote terminal in connection with the identification number #4, and re-assigns band-widths to the four remote terminals, and controls the command-cell generation timer 112 to stop the time count, since there is left no available identification number, now.

When the window signal is disabled, the band-width control unit 110 begins to supply identification numbers assigned to the remote terminals whereto transmission permitting information is to be sent, to the transmission-permission inserting unit 103 one after another.

The control-data-cell generating/terminating unit 107 generates a control-data-cell addressed to the remote terminal of the identification number #4, that is, the fourth remote terminal, writing therein the phase-correction information previously received from the phase control unit 108 in the window period. The phase correction information is extracted by the control-data-cell generating/terminating unit 209 of the fourth remote terminal and notified to the cell-transmission control unit 203, to be used for cell-phase control.

Thus, the local station begins automatically to communicate with four remote terminals.

FIG. 3 is a time chart illustrating the above sequence.

When a time-count stop signal 301, which controls the command-cell generation timer 112 to stop the time count, is disabled, upward cells 304 having identification numbers #1, #2 and #3 are received by the local station.

Then a command-cell generation trigger 302 is generated and the window signal 303 is enabled for suspending the upward cells 304 having the identification numbers #1 to #3. In the window period, a control data cell from the newly installed remote terminal is received and the unused identification number #4 is assigned to the remote terminal, which means there is left no available identification number, and so, the time-count stop signal 301 is enabled.

Then, the window signal 303 is disabled and the upward cells 304 with identification numbers #1, #2, #3 and #4 begin to be transmitted being phase controlled from the four remote terminals.

Heretofore, the embodiment is described in connection with a new installation of the fourth remote terminal. When a remote terminal connected to the local station is cut and an identification number, #2, for example, becomes unused, the time-count stop signal 301 is disabled and a similar sequence as shown in FIG. 3 is repeated in connection with the identification number #2.

As heretofore described, in a data-transmission system having a star connection wherein the upward communication is performed according to the TDMA system and the downward communication is performed according to the TDM system, making use of fixed-length cells, acquisition of the proper identifier of a newly installed remote terminal and assignment of a local identification number to the newly installed remote terminal can be performed automatically, according to the embodiment, and appropriate cell transmission control of the remote terminals, such as transmission permission control, band-width control or cell-phase control, can be performed in the local station making use of the local identification numbers assigned in connection with the proper identifiers of the remote terminals, enabling to improve transmission efficiency of the data transmission system.

What is claimed is:

1. A terminal management method of a data transmission system having a local station and remote terminals star-connected to the local station wherein upward communication from the remote terminals to the local station is performed according to a TDMA (Time Division Multiple Access) system and downward communication from the local station to the remote terminals is performed according to a TDM (Time Division Multiplex) system making use of cells having fixed length; the terminal management method comprising:

downward transmitting a command cell periodically from the local station when there is an available identification number which is not assigned to any of the remote terminals star-connected to the local station, the available identification number being written in the command cell;

generating a window period after downward transmitting the command cell, transmission of upward cells from the remote terminals, whereto identification numbers are assigned, being inhibited in the window period;

receiving the command cell performed by a newly installed remote terminal which is not assigned with any identification number, and obtaining the available identification number written in the command cell;

upward transmitting a control data cell from the newly installed remote terminal in the window period, a proper identifier of the newly installed remote terminal being written in the control data cell together with the available identification number;

receiving the control data cell performed by the local station for obtaining the proper identifier of the newly installed remote terminal together with the available identification number; and assigning the available identification number to the newly installed remote terminal and registering the proper identifier of the newly installed remote terminal in connection with the available identification number.

2. The terminal management method as recited in claim 1; wherein transmission control including transmission permission control, band-width control and cell-phase control of each of the remote terminals is performed by the local station making use of the identification number assigned to each of the remote terminals.

3. The terminal management method as recited in claim 1; wherein downward transmitting the command cell is not performed when there is no available identification number which is not assigned to any of the remote terminals.

4. A data transmission system having a local station and remote terminals star-connected to the local station wherein upward communication from the remote terminals to the local station is performed according to a TDMA system and downward communication from the local station to the remote terminals is performed according to a TDM system making use of cells having fixed length; the local station comprising:

a command-cell generation timer for generating a command-cell generation trigger periodically when the command-cell generation timer is not controlled to stop time count;

a command-cell generating unit for generating a command cell to be downward transmitted every time the command-cell generation trigger is supplied from the command-cell generation timer, an available identification number being written in the command cell;

a window generation timer for enabling a window signal every time the command-cell generation trigger is supplied from the command-cell generation timer, transmission of upward cells from the remote terminals, whereto identification numbers are assigned, being inhibited during the window signal is enabled;

a control-data-cell generating/terminating unit for detecting a newly installed remote terminal by receiving a control data cell during the window signal is enabled, a proper identifier of the newly installed remote terminal being written in the control data cell received during the window signal is enabled together with the available identification number; and a terminal management unit for assigning the available identification number to the newly installed remote terminal, and registering the proper identifier of the newly installed remote terminal in connection with the available identification number.

5. The data transmission system as recited in claim 4; one of the remote terminals comprising:

a command-cell terminating unit for extracting the available identification number written in the command cell downward transmitted from the local station; and a control-data-cell generating/terminating unit for generating a control data cell to be upward transmitted during the transmission of upward cells from the remote terminals whereto identification numbers are assigned is inhibited, a proper identifier of the newly installed remote terminal being written in the control data cell together with the available identification number.

6. The data transmission system as recited in claim 4; wherein:

the control-data-cell generating/terminating unit also performs cell-phase control by generating a control data cell, wherein phase-correction information is written, addressed to each of the remote terminals making use of corresponding one of the identification numbers assigned to the remote terminals; and the terminal management unit also performs band-width assignment of each of the remote terminals assigned with identification numbers, transmission permitting information to each of the remote terminal being inserted in headers of downward cells referring to the band-width assignment, on condition the window signal is disabled.

7. The data transmission system as recited in claim 4; wherein:

the command-cell generation timer is controlled to stop the time count by the terminal management unit when there is left no available identification number.

8. The data transmission system as recited in claim 5; wherein:

the command-cell terminating unit is controlled to ignore the command cell after the available identification number is assigned to the remote terminal by the local station.

9. The data transmission system as recited in claim 4; wherein:

an identification number assigned in one of the remote terminal is registered as the available identification number when connection of said one of the remote terminal is cut from the local station.

10. The data transmission system as recited in claim 4; wherein:

the command-cell generation timer is controlled to start the time count when an identification number is registered as the available identification number.

\* \* \* \* \*